United States Patent
Yoo (10) Patent No.: US 12,475,640 B2
(45) Date of Patent: Nov. 18, 2025

(54) DEVICE AND METHOD FOR PROCESSING SENSING INFORMATION

(71) Applicant: HL KLEMOVE CORP., Incheon (KR)

(72) Inventor: JaeChang Yoo, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 335 days.

(21) Appl. No.: 18/119,831

(22) Filed: Mar. 10, 2023

(65) Prior Publication Data

US 2024/0135639 A1    Apr. 25, 2024

(30) Foreign Application Priority Data

Oct. 12, 2022   (KR) .................. 10-2022-0130240

(51) Int. Cl.
G06T 17/00   (2006.01)
G06T 3/40    (2024.01)
G06T 7/20    (2017.01)
G06V 10/25   (2022.01)
G06V 10/44   (2022.01)

(52) U.S. Cl.
CPC ............... *G06T 17/00* (2013.01); *G06T 3/40* (2013.01); *G06T 7/20* (2013.01); *G06V 10/25* (2022.01); *G06V 10/44* (2022.01); *G06T 2207/20081* (2013.01); *G06T 2207/20084* (2013.01)

(58) Field of Classification Search
None
See application file for complete search history.

(56) References Cited

U.S. PATENT DOCUMENTS

2021/0149041 A1*   5/2021   Cho ................. G06T 3/4046

FOREIGN PATENT DOCUMENTS

| JP | 2021-508863 | 3/2021 |
|----|---|---|
| KR | 10-2020-0067506 | 6/2020 |
| KR | 10-2020-0070854 | 6/2020 |
| KR | 10-2021-0061597 | 5/2021 |
| KR | 10-2253280 | 5/2021 |

OTHER PUBLICATIONS

Notice of Allowance dated Oct. 15, 2024 for Korean Patent Application No. 10-2022-0130240 and its English translation by Google Translate.
Office Action dated May 2, 2024 for Korean Patent Application No. 10-2022-0130240 and its English translation provided by the Applicant's foreign counsel.

* cited by examiner

*Primary Examiner* — Peter Hoang
(74) *Attorney, Agent, or Firm* — WOMBLE BOND DICKINSON (US) LLP

(57) ABSTRACT

A sensing information processing device and method are capable of improving detection performance of a sensor by generating virtual information with improved or increased resolution using a learning model. In addition, a sensing information processing device and method are capable of further improving detection performance of a sensor by training a learning model using sensing information of different resolutions.

16 Claims, 10 Drawing Sheets

DEVICE AND METHOD FOR PROCESSING SENSING INFORMATION

CROSS REFERENCE TO RELATED APPLICATION

This application claims priority from Korean Patent Application No. 10-2022-0130240, filed on Oct. 12, 2022, which is hereby incorporated by reference for all purposes as if fully set forth herein.

TECHNICAL FIELD

Some embodiments of the present disclosure generally relate to a device and method for processing sensing information.

BACKGROUND

Recently, with the rapid development of sensor technology and the spread of artificial intelligence technology, the market size of an advanced driver assistance systems (ADAS) for preventing and mitigating various accidents generated during driving of a vehicle is rapidly increasing. The ADAS may be an assistance system capable of supporting a driver for the purpose of improving safety and convenience of a driver and avoiding a dangerous situation by using multiple sensors mounted inside or outside a vehicle. The sensors for the ADAS for monitoring vehicle surroundings are one of the essential parts of an advanced driver assistance system, and may include a camera, an infrared sensor, an ultrasonic sensor, LiDAR, radar, and so on.

In particular, each sensor mounted on a vehicle has a different physical quantity of detection data and a different effective detectable range (e.g., field of view; FOV) for acquiring data. In addition, since the sensor has limitations in data acquisition speed (e.g., frame rate) and data resolution, there may be limitations in the implementation functions in the vehicle. In addition, each sensor has a fundamental physical limitation, and therefore it may be difficult to implement desired performance with only a single sensor. Moreover, even if high-performance, high-cost sensors are used to overcome the limitations of a single sensor, there is a problem in that the manufacturing cost may increase and profitability may decrease if those expensive sensors are installed in a vehicle.

Therefore, for a sensor mounted on a vehicle, there is increasing the need for a processing technology of sensing information linked to artificial intelligence, which has recently undergone rapid technological development. Specifically, there may be an area with relatively poor detection performance among areas detected by a sensor installed in a vehicle, and thus, an unstable control may occur. Accordingly, there is a need for a technology capable of improving detection performance in a specific area by applying artificial intelligence technology to a sensor mounted on a vehicle.

SUMMARY

Various embodiments of the present disclosure may provide a sensing information processing device and method capable of improving detection performance of a sensor by generating virtual information with improved or increased resolution using a learning model.

In an aspect of the present disclosure, the present embodiments may provide a sensing information processing device including a learning data generator configured to acquire sensing information of different resolutions from a plurality of sensors including a first sensor and a second sensor, and perform pre-processing on the sensing information to generate learning data, a model learning device configured to train a learning model for generating virtual information about an overlap area based on the learning data, and an information provider configured to generate and provide virtual information with improved resolution from sensing information for a specific area based on a trained learning model.

In another aspect of the present disclosure, the present embodiments may provide a sensing information processing method including acquiring sensing information of different resolutions from a plurality of sensors including a first sensor and a second sensor, and generating learning data by performing pre-processing on the sensing information, training a learning model for generating virtual information about an overlap area based on the learning data, and generating and providing virtual information with improved resolution from sensing information for a specific area based on a trained learning model.

According to certain embodiments of the present disclosure, a sensing information processing device and method may be capable of improving detection performance of a sensor by generating virtual information with improved or increased resolution using a learning model.

DETAILED DESCRIPTION

The present disclosure relates to a sensing information processing device and method.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

In the disclosure, a sensor is described as an example a sensor mounted on a vehicle, but, is not limited thereto. In addition, the present embodiments may be applied to devices (e.g., moving objects such as drones, airplanes, and robots) using a plurality of sensors having different resolutions in addition to vehicles. In addition, the sensor may be located inside or outside the sensing information processing device.

In addition, in this specification, training may mean a series of actions or processes for learning, and learning may mean a result of training. However, a series of actions or processes for learning or their results may be expressed as either training or learning. That is, in this specification, learning and training are used as equivalent.

Hereinafter, there will be described embodiments of the present disclosure in detail with reference to the accompanying drawings.

Figure 1:
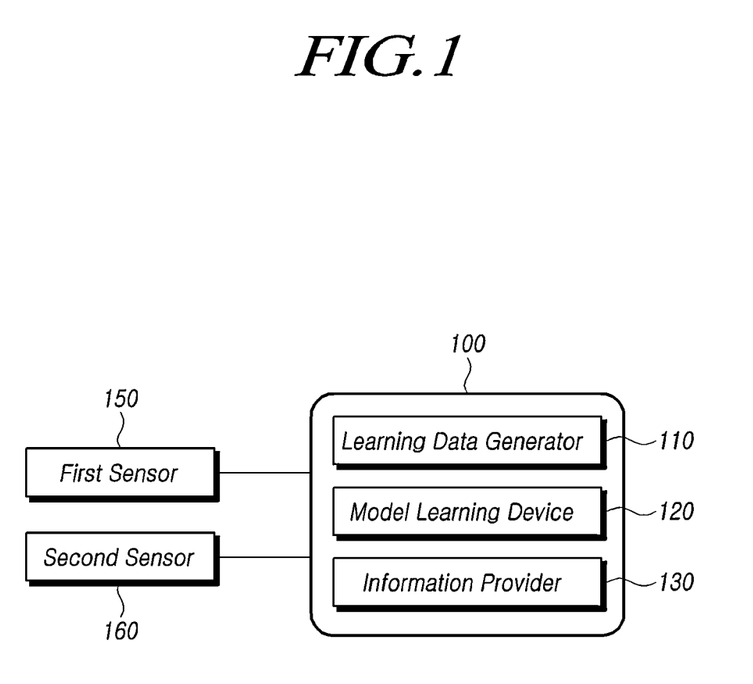
FIG. 1 illustrates a configuration of a sensing information processing device according to an embodiment of the present disclosure.

FIG. 1 illustrates a configuration of a sensing information processing device according to an embodiment of the present disclosure.

Referring to FIG. 1, a sensing information processing device 100 according to an embodiment of the present disclosure may include a learning data generator 110, a model learning device 120 and an information provider 130. According to an embodiment of the present disclosure, the learning data generator 110 may be configured to acquire sensing information of different resolutions from a plurality of sensors including a first sensor 150 and a second sensor 160, and perform pre-processing on the sensing information to generate learning data, the model learning device 120 may be configured to train a learning model for generating virtual information about an overlap area based on the learning data, and the information provider 130 may be configured to generate and provide virtual information with improved resolution from sensing information for a specific area based on a trained learning model.

The learning data generator 110 according to an embodiment of the present disclosure may receive or acquire sensing information having different resolutions from a plurality of sensors including a first sensor and a second sensor. In addition, the learning data generator 110 may generate learning data by performing pre-processing on the acquired sensing information. For example, the learning data generator 110 may acquire first sensing information with low-resolution about, or associated with, a first area detected using the first sensor and second sensing information with high-resolution about, or associated with, a second area detected using the second sensor. For example, the learning data generator 110 may acquire the sensing information of different resolutions from a plurality of sensors including, for example, but not limited to, a camera, lidar, radar, or corner radar mounted on or associated with a vehicle. Specifically, the first sensor may be a corner radar which is a low-resolution sensor mounted on the front side or the rear side of the vehicle and having a wide field of view (FOV). The first area may be an overlap area in which angles of view between corner radars on both sides overlap among short range areas of the front left and right sides or the rear left and right sides detected using corner radars. On the other hand, the second sensor may be a front or rear radar, which is a high-resolution sensor mounted on the front or rear of the vehicle and having a narrow field of view. The second area may be a front or rear short-range or long-range area detected using a front radar or a rear radar. However, both side corner radars and front and rear radars are examples of a plurality of sensors for illustration purposes only, and are not limited thereto. Any combination of one or more sensors with a relatively low resolution and one or more sensors with a relatively high resolution may be used.

In addition, for example, the learning data generator 110 may generate learning data by using sensing information about, or associated with, an overlap area in which the first area and the second area partially overlap. That is, the overlap area may be an area in which all feature points are detected from each of the first sensing information (e.g. low-resolution sensing information) and the second sensing information (e.g. high-resolution sensing information). Specifically, the learning data generator 110 may generate learning data for training a learning model by using the first sensing information and the second sensing information for the overlap area. In this case, the second sensing information may be target information for training or learning a learning model with high-resolution sensing information. In addition, the learning data may include virtual information generated by inputting first sensing information (e.g. low-resolution sensing information) to the learning model.

For example, the learning data generator 110 may extract feature information including count information, range rate information, and power information from sensing information, and convert the feature information into image information. For example, the learning data generator 110 may perform pre-processing on point cloud data, which is sensing information obtained from a radar, and convert the data into image information. Specifically, the learning data generator 110 may determine whether an object exists by dividing each pixel information constituting the point cloud data, which is unstructured data, by a preset resolution. Accordingly, if it is determined that the object exists, the learning data generator 110 may extract feature information including count information on the number of points in the area where the object exists, range rate information on relative coordinates between the point and the radar, and power information on the speed and reception strength of the point, and may convert the feature information into RGB (Red-Green-Blue) image information.

The model learning device 120 according to an embodiment of the present disclosure may train or learn a learning model for generating virtual information about, or associated with, an overlap area based on learning data. For example, the model learning device 120 may train the learning model by using first and second sensing information about, or associated with, the overlap area and the virtual information generated from the learning model as training data or learning data. For example, the learning model may include a first learning model for generating virtual information based on sensing information and a second learning model for determining authenticity of the virtual information. In addition, the learning model may improve the performance of the first learning model and the second learning model by competing with each other. For instance, the learning model may comprise a generative adversarial network (GAN) model.

In an exemplary embodiment of the present disclosure, the model learning device 120 may train the first learning model to generate virtual information from the first sensing information (e.g. low-resolution sensing information) by using the high-resolution second sensing information (e.g. high-resolution sensing information) as target information. In addition, the model learning device 120 may train the second learning model to determine authenticity using the virtual information generated from the sensing information and the first learning model. In addition, the model learning device 120 may train a first learning model to reduce or decrease the accuracy of the authenticity determination result based on the sensing information and the authenticity determination result of the virtual information, and may train the second learning model to increase the accuracy of the authenticity determination result. Specifically, the model learning device 120 may calculate the accuracy of the authenticity determination result based on the probability of determining that the sensing information is real and the probability of determining that the virtual information is not real in the second learning model. In addition, the model learning device 120 may train the first learning model to minimize the accuracy of the authenticity determination result and train the second learning model to maximize the accuracy of the authenticity determination result.

The information provider 130 according to an embodiment of the present disclosure may generate and provide virtual information with improved or increased resolution from sensing information for a specific area based on a trained learning model. For example, if learning or training of the learning model is completed, the information provider 130 may input low-resolution sensing information of a specific area to the learning model and generate virtual information with improved or increased resolution. For example, if learning or training of the learning model is completed, the information provider 130 may generate virtual information with improved or increased resolution by inputting low-resolution sensing information for a specific area to the first learning model that has learned. In addition, the information provider 130 may additionally generate tracking information on one or more surrounding objects using the virtual information generated from the sensing information on the specific area. In detail, the information provider 130 may additionally generate the tracking information about the objects by tracking the objects around the vehicle by comparing the previous and present virtual information generated based on the sensing information of the vehicle.

Figure 2:
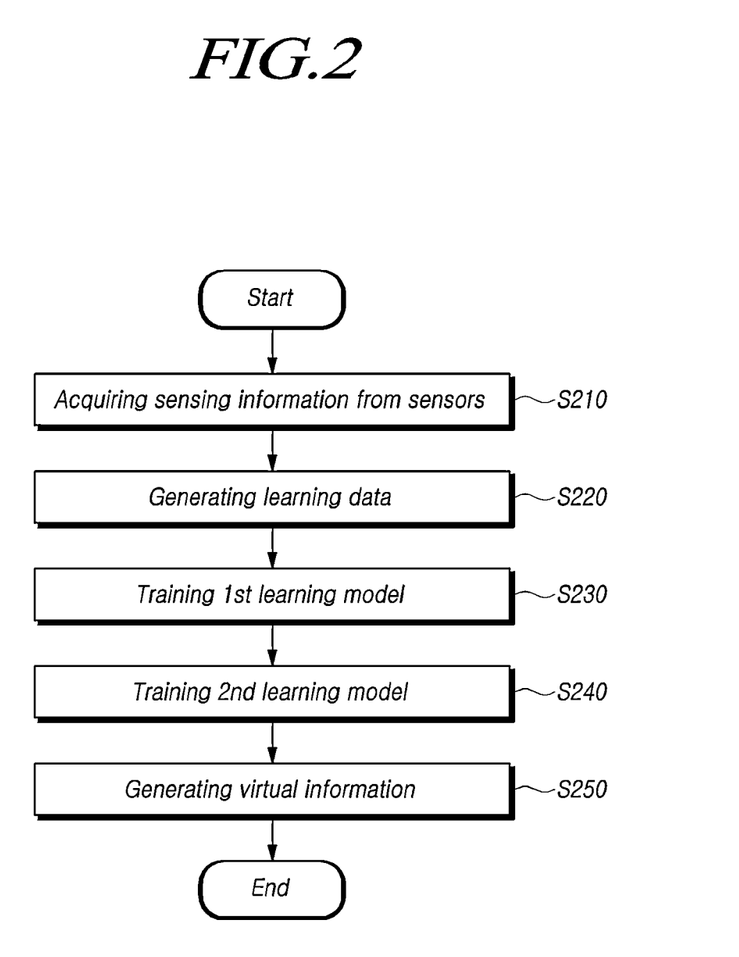
FIG. 2 is a flowchart illustrating a method or operation of generating virtual information by a sensing information processing device according to an embodiment of the present disclosure.

FIG. 2 is a flowchart illustrating a method or operation of generating virtual information by a sensing information processing device according to an embodiment of the present disclosure.

Referring to FIG. 2, the learning data generator 110 of the sensing information processing device of FIG. 1 according to an embodiment of the present disclosure may receive or acquire sensing information from a plurality of sensors (S210). For example, the learning data generator 110 may receive or obtain sensing information having different resolutions from a plurality of sensors including a first sensor 150 and a second sensor 160 mounted on or associated with the vehicle. For example, the learning data generator 110 may obtain first sensing information (e.g. low-resolution sensing information) for the first area using a for detecting left and right sides of the vehicle. The first area may be an overlap area in which angles of view between first sensors mounted on both sides of the vehicle overlap. In addition, the learning data generator 110 may obtain second sensing information (e.g. high-resolution sensing information) for a second area by using a second sensor for detecting the front or rear of the vehicle. The second area may be a short-range area and long-range area of the second sensor mounted on the front and rear of the vehicle.

The learning data generator 110 of the sensing information processing device according to an embodiment of the present disclosure may generate learning data by performing pre-processing on the acquired sensing information (S220). For example, the learning data generator 110 may extract feature information from the sensing information about an overlap area, and convert the extracted feature information into image information to generate learning data. For example, the learning data generator 110 may extract an overlap area where both the first sensing information and the second sensing information are acquired as a region of interest (RoI). In particular, the short-range area (0 to 60 m) may be set based on the second sensor, and the long-range area (60 to 100 m) may be set based on the first sensor. In addition, in the overlap area, the angle of view of the short-range area may be set based on the first area, and the angle of view of the long-range area may be set based on the second area. For another example, the learning data generator 110 may extract feature information about an object from each sensing information acquired for each area. Furthermore, the learning data generator 110 may generate learning data by converting feature information including count information, range rate information, and power information for the object into RGB image information.

The model learning device 120 of the sensing information processing device according to an embodiment of the present disclosure may train or learn a first learning model based on the learning data (S230). For example, the model learning device 120 may train the first learning model for generating virtual information based on the sensing information. For example, the model learning device 120 may train the first learning model to generate the virtual information from the first sensing information (e.g. low-resolution sensing information) by using the second sensing information (e.g. high-resolution sensing information) as target information. The first learning model may be trained to decrease the accuracy of the result of determining the authenticity of the actual sensing information determined by the second learning model and the generated virtual information.

The model learning device 120 of the sensing information processing device according to an embodiment of the present disclosure may train or learn a second learning model based on the learning data (S240). For example, the model learning device 120 may train the second learning model for determining the authenticity of the input information (e.g., whether input information is genuine or not). For example, the model learning device 120 may train the second learning model to determine authenticity using actual sensing information and the virtual information generated from the first learning model. The second learning model may be trained to increase the accuracy of the authenticity determination result of determining whether the actual sensing information and the virtual information generated by the first learning model are authentic.

The information provider 130 of the sensing information processing device according to an embodiment of the present disclosure may generate virtual information with improved or increased resolution from the sensing information for a specific area based on the learning model (S250). For example, the information provider 130 may generate the virtual information with improved or increased resolution from the sensing information for the specific area based on the learning model for which training has been completed. For example, when the training or learning of the learning model is completed, the information provider 130 may input first sensing information (e.g. low-resolution sensing information) to the trained learning model, and output virtual information having a higher resolution than the first sensing information. Here, the learning model for which training has been completed may mean only for the first learning model.

Figure 3:
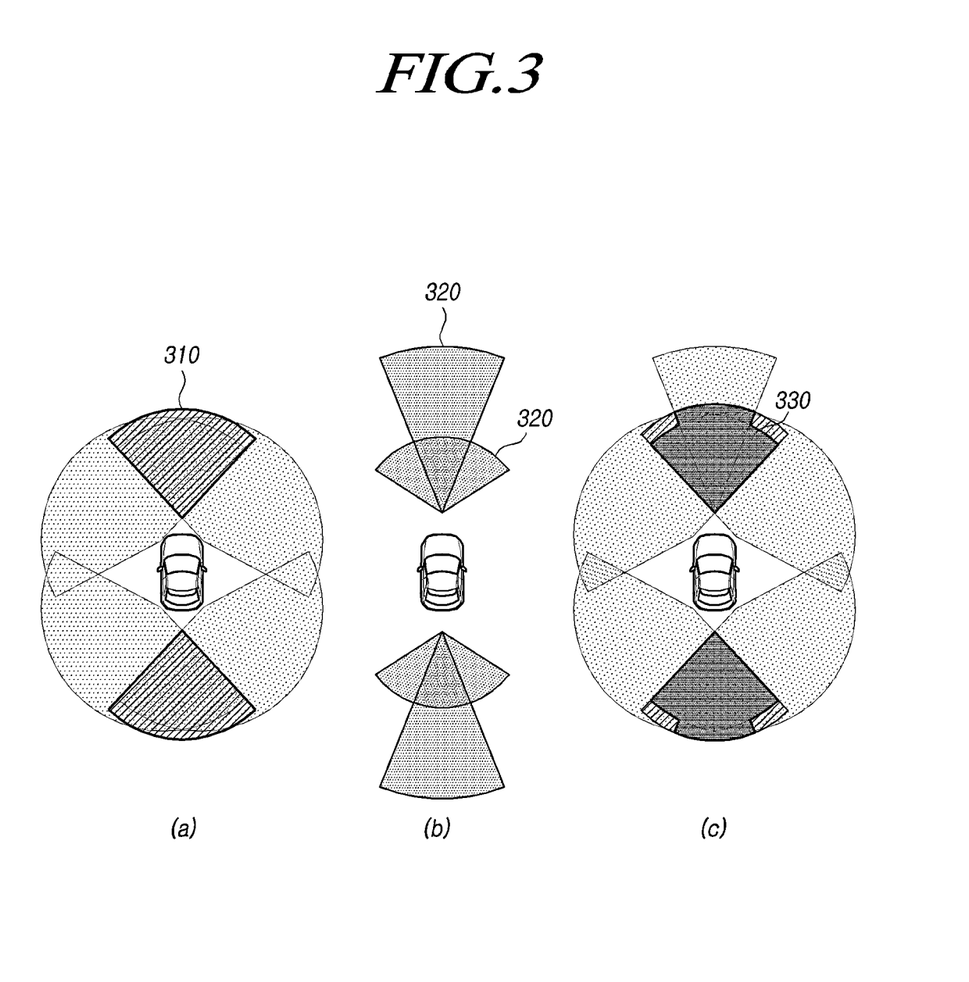
FIG. 3 is a diagram for explaining an overlap area in which a sensing information processing device generates virtual information according to an embodiment of the present disclosure.

FIG. 3 is a diagram for explaining an overlap area in which a sensing information processing device generates virtual information according to an embodiment of the present disclosure.

Referring to FIG. 3, it will be described an overlap area in which a learning model of a sensing information processing device according to an embodiment of the present disclosure generates virtual information. For example, the learning model of the sensing information processing device may generate virtual information about the overlap area by training or learning a learning model. For example, the learning model may train a deep learning-based learning model using sensing information of different resolutions received or acquired from a plurality of sensors including a first sensor and a second sensor.

Referring to FIG. 3(*a*), the sensing information processing device according to an embodiment of the present disclosure may utilize point cloud data of a corner radar as learning data. For example, the learning data generator 110 of the sensing information processing device may acquire first sensing information (e.g. low-resolution sensing information) about a first area 310 detected from the first sensor, for example, a corner radar. In addition, the learning data generator 110 may generate learning data using the acquired first sensing information. For instance, the corner radar may be a short-range radar (SRR), and may have a detection range of 0 m to 100 m and an angle of view of ±75 degrees. For example, the first area 310 may include an overlap area of the front side where the angle of view of a left corner radar mounted on the front-left side of the vehicle and the angle of view of a right corner radar mounted on the front-right side of the vehicle overlap. In addition, the first area 310 may comprise an overlap area of the rear side where the angle of view of a left corner radar mounted on the rear-left side of the vehicle and the angle of view of a right corner radar mounted on the rear-right side of the vehicle overlap. The first sensing information (e.g. low-resolution sensing information) of the first area 310 may be used as learning data corresponding to input information of a learning model. Here, the first sensing information may be original information obtained from a radar and may be in the form of point cloud data.

Referring to FIG. 3(*b*), the sensing information processing device according to an embodiment of the present disclosure may utilize point cloud data of a front radar or a rear radar as learning data. For example, the learning data generator 110 of the sensing information processing device may receive or acquire second sensing information (e.g. high-resolution sensing information) about a second area 320 sensed from a second sensor such as a front radar or rear radar. In addition, the learning data generator 110 may generate learning data using the acquired second sensing information. For instance, the front radar or the rear radar may a long-range radar (LRR), and may have a detection range of 0 m to 200 m. However, the angle of view may be ±40 degrees in the short range (0 to 60 m) and ±10 degrees in the long range (60 to 200 m). For example, the second area 320 may include a short-range area and a long-range area of a front radar mounted on the front of the vehicle. Also, the second area 320 may include a short-range area and a long-range area of a rear radar mounted on the rear of the vehicle. The second sensing information (e.g. high-resolution sensing information) for the second area 320 may be used as target information for training a learning model and learning data corresponding to actual environment information. Here, the second sensing information may be original information obtained from the radar and may be in the form of point cloud data.

Referring to FIG. 3(*c*), the sensing information processing device according to an embodiment of the present disclosure may generate the learning data by using sensing information about the overlap area 330 in which the first area 310 and the second area 320 partially overlap. For example, the learning data generator 110 of the sensing information processing device may utilize point cloud data for the overlap area 330 in which the first area 310 of the front overlapping angles of view of corner radars mounted on the left and right sides of the front of the vehicle and the second area 320 of the front of the vehicle including, which include the short-range and long-range areas of the front radar, overlap as the learning data. Here, the overlap area 330 may be an area for which the virtual information with improved or increased resolution is generated using the learning model.

For example, the overlap area 330 may be an area in which the angle of view of the short range (0 to 60 m) is ±40 degrees and the angle of view of the long range (60 to 100 m) is ±10 degrees. Specifically, in the short-range area (0 to 60 m) of the overlap area 300, point cloud data for the short-range area of the corner radar may be used as input information of the learning model. In addition, point cloud data for a short-range area and a long-range area of the front radar or the rear radar may be used as the output information (target information) of the learning model. On the other hand, in the long-range area (60 to 100 m) of the overlap area 300, point cloud data for the short-range area of the corner radar may be used as input information of the learning model. In addition, point cloud data for a long-range area of a front radar or a rear radar may be used as the output information (target information) of the learning model.

Figure 4:
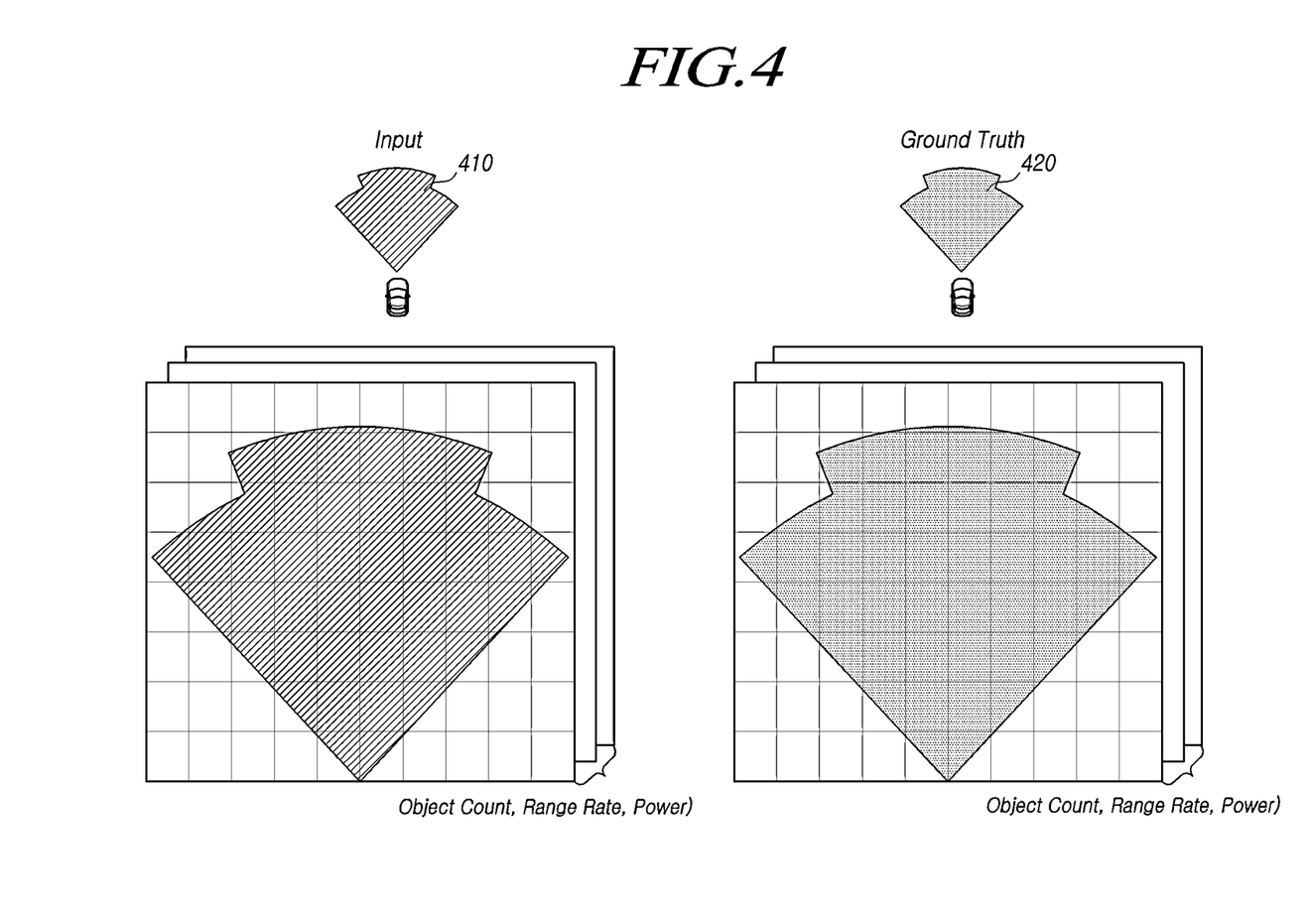
FIG. 4 is a diagram for explaining learning data of a sensing information processing device according to an embodiment of the present disclosure.

FIG. 4 is a diagram for explaining learning data of a sensing information processing device according to an embodiment of the present disclosure.

Referring to FIG. 4, it will be described an example in which the learning data generator 110 of the sensing information processing device according to an embodiment of the present disclosure pre-processes sensing information to generate learning data. For example, the learning data generator 110 may generate learning data with converted image information by performing pre-processing on point cloud data. For example, the learning data generator 110 may generate input information 410 of a learning model for an overlap area by performing pre-processing on the first sensing information (e.g. low-resolution sensing information) for the first area. The input information 410 may be RGB image information converted by performing pre-processing on the point cloud data of the overlap area.

For another example, the learning data generator 110 may generate actual or real environment information 420 of the learning model for the overlap area by performing pre-processing on the second sensing information (e.g. high-resolution sensing information) for the second area. The actual environment information 420 may be training data for training and testing the output information of the learning model. In particular, the actual environment information 420 may be used as target information of a learning model. The actual environment information 420 may be image information converted by pre-processing point cloud data for an overlap area.

For example, the learning data generator 110 may perform pre-processing on point cloud data to convert the point cloud data into image information about an overlap area. For example, the learning data generator 110 may extract an overlap area from the point cloud data as a monitoring range such as a region of interest (RoI). Accordingly, the amount of calculation can be reduced and the accuracy of the learning can be improved by excluding information on areas other than the overlap area, which is the area of interest. In addition, for another example, the learning data generator 110 may divide each pixel information corresponding to an overlap area in the point cloud data by a preset resolution to determine the presence of an object. Accordingly, if it is determined that the object exists, the learning data generator 110 may extract the feature information including the count information on the number of points in the area where the object exists, the range rate information on the relative coordinates between the point and the radar, and the power information about the speed and reception strength of the point. The learning data generator 110 may convert feature information into RGB image information. For example, the learning data generator 110 may use an algorithm such as a separate point cloud library (PCL) to convert point cloud data into RGB image information. However, the pre-processing operation has been described as an example, and is not limited thereto.

Figure 5:
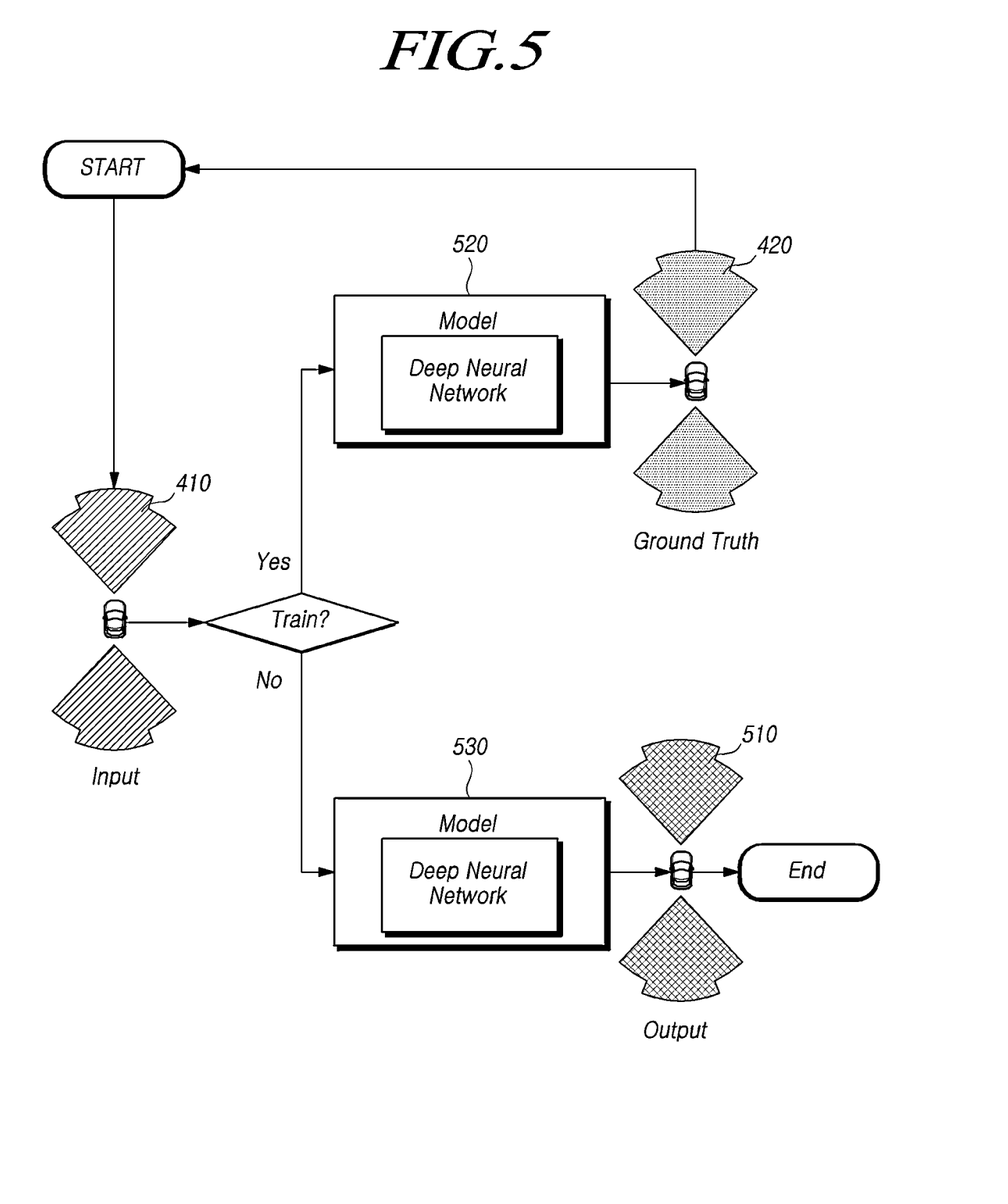
FIGS. 5 to 7 are diagrams for explaining a learning model of a sensing information processing device according to an embodiment of the present disclosure.
Figure 6:
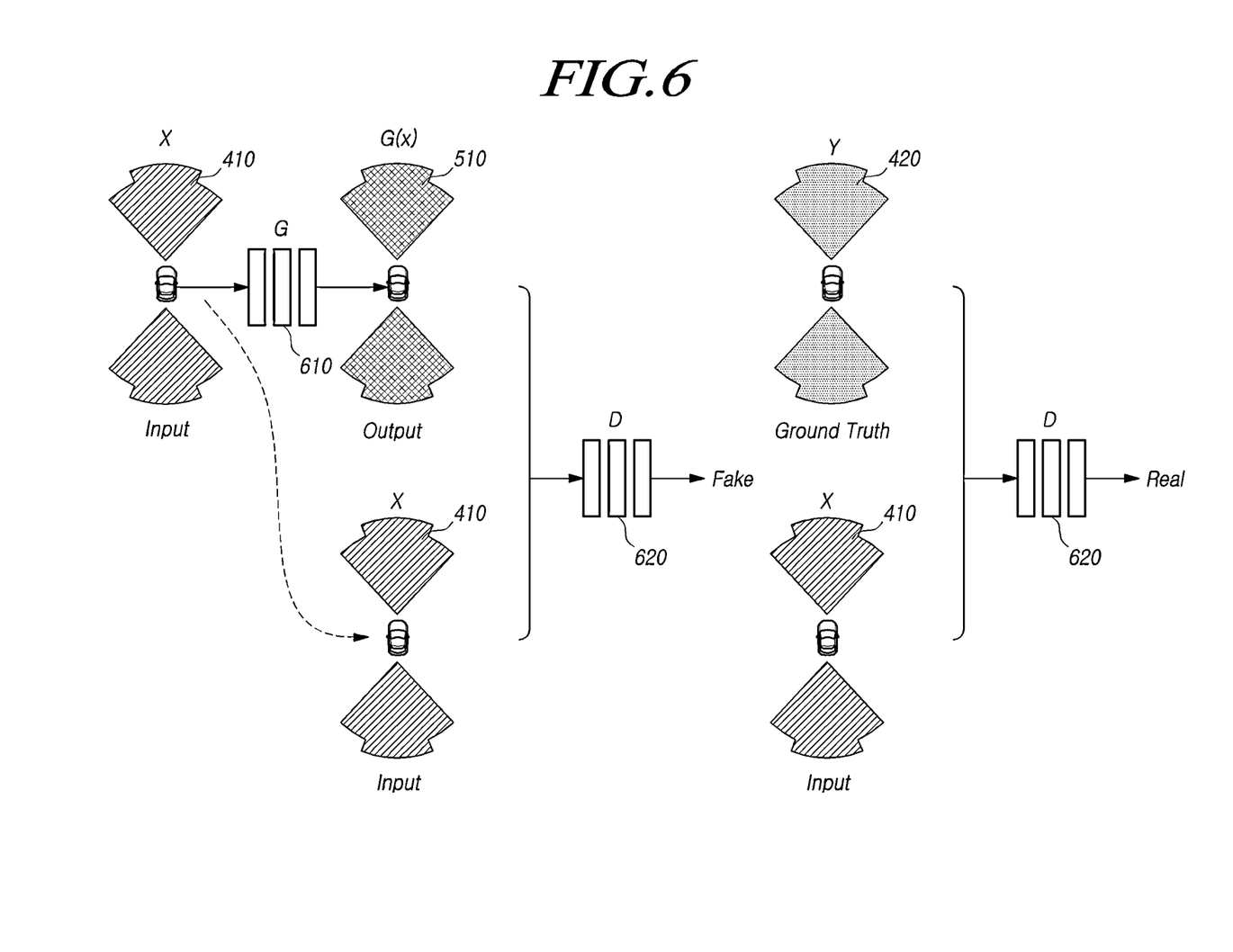
Figure 7:
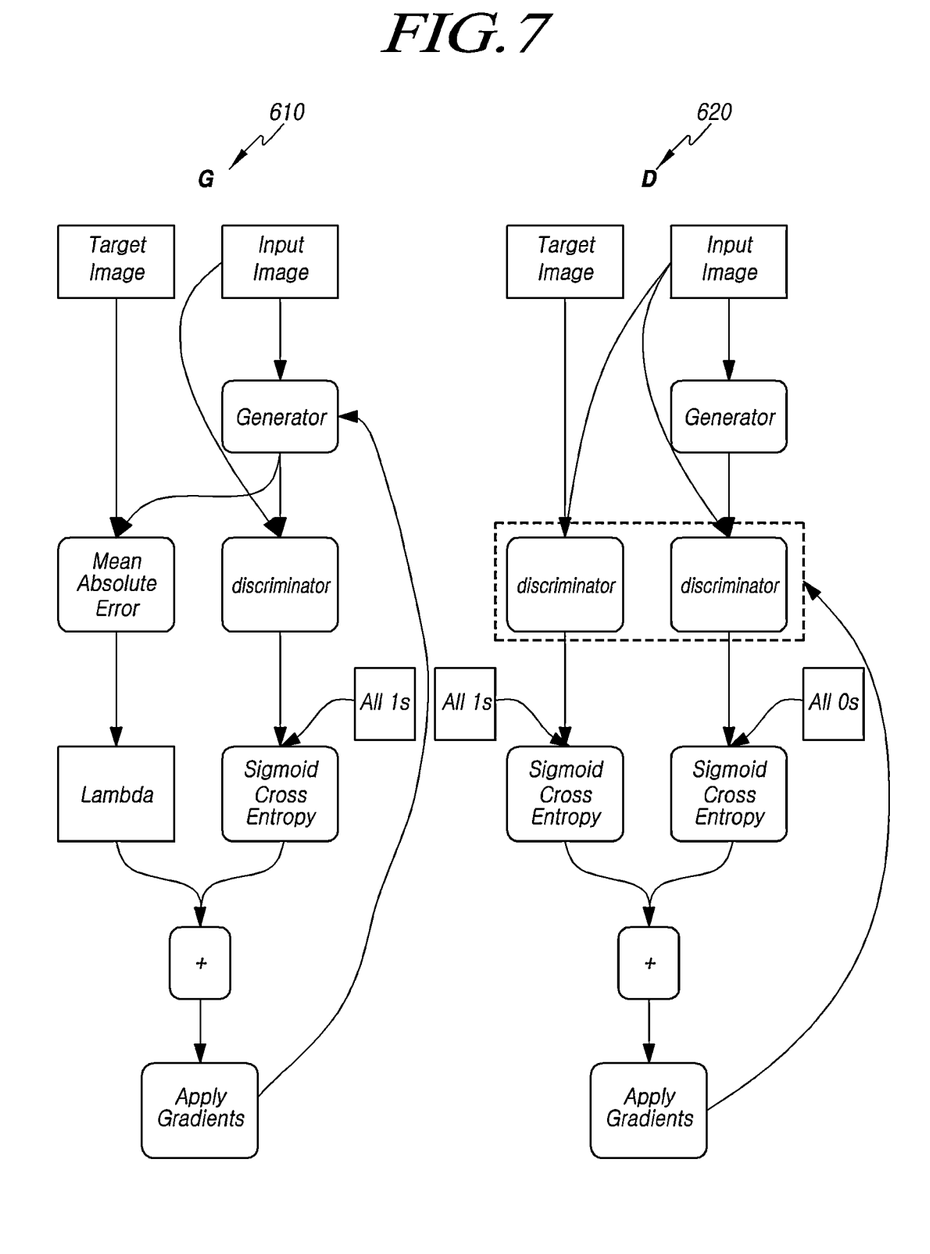

FIGS. 5 to 7 are diagrams for explaining a learning model of a sensing information processing device according to an embodiment of the present disclosure.

Referring to FIG. 5, it will be described an example of applying sensing information to a learning model of a sensing information processing device according to an embodiment of the present disclosure. A learning model of the sensing information processing device 100 according to an embodiment may be a model designed to increase the resolution of sensing information, and may have a machine learning structure. For example, the model learning device 120 may train a learning model 520 including a first learning model for generating virtual information 420 based on sensing information 410 and a second learning model for determining the authenticity of the virtual information 420.

That is, the learning model may have a structure including a first learning model operating as a generator and a second learning model operating as a discriminator. In addition, when the training is completed, the information provider 130 may input the sensing information 410 for a specific area to a trained learning model 530, and output virtual information 510 with improved resolution. For instance, the learning model may be an image-to-image translation model, and may be a Pix2Pix model among generative adversarial network (GAN) models, although not require. In particular, the learning model may be a model capable of performing supervised learning by inputting second sensing information (e.g. high-resolution sensing information) as target information based on an unsupervised learning algorithm. However, the type of learning model is described as an example, and is not limited thereto.

For example, the model learning device 120 may train a first learning model to generate a plurality of virtual information 420 by inputting point cloud data of a corner radar as a plurality of sensing information 410. In addition, the first learning model may perform stable training by inputting point cloud data of a front radar or a rear radar as target information. In addition, the model learning device 120 may train a second learning model to determine the authenticity by using the plurality of virtual information 420 and the plurality of sensing information 410 as input information.

In addition, for example, the model learning device 120 may complete the training when the learning model satisfies a learning completion condition or training completion condition. Specifically, the model learning device 120 may complete the training when the second learning model fails to determine the authenticity of the virtual information generated from the first learning model. That is, the learning model may complete the training if the probability of determining that the input virtual information is real is equal to or less than a predetermined value, for example, but not limited to, ½ or less. Alternatively, the model learning device 120 may complete training based on similarities between virtual information and real image information captured by a camera.

For another example, if the training of the learning model is completed, the information provider 130 may input sensing information about a specific area detected from the corner radar to the training-completed learning model 530, and may output virtual information 510 with improved or increased resolution. In addition, the output virtual information 510 may be high-resolution virtual information generated using point cloud data of a front radar or a rear radar as target information. That is, if the training of the learning model is completed, only the first learning model operating may be used as a generator.

Referring to FIG. 6, it will be described an example of applying sensing information to a first learning model and a second learning model of the sensing information processing device according to an embodiment of the present disclosure. For example, the learning model of the sensing information processing device may comprise a generative adversarial network (GAN) model structure, and may include a first learning model 610 as a generator and a second learning model 620 as a discriminator. For example, the model learning device 120 may generate a plurality of virtual information 510 from actual sensing information 410 using the first learning model 610. Here, the actual sensing information 410 may include low-resolution sensing information used as input information of the first learning model 610 and high-resolution sensing information used as target information. In addition, the model learning device 120 may train the second learning model to determine the authenticity of the virtual information 510 generated from the first learning model 610 and the actual sensing information 410. Here, the second learning model 620 may receive the generated virtual information 510 and the actual sensing information 410 as a pair and determine the authenticity thereof.

Specifically, the model learning device 120 may use a first loss function to reduce the deviation between the sensing information 410 and the virtual information 510 in the first learning model 610. The first loss function may be a function for determining the generated virtual information 510 in units of pixels, and may be expressed as in Equation 1.

$$\mathcal{L}_{L1}(G) = \mathbb{E}_{x,y,z}[\|y - G(x,z)\|_1] \qquad \text{[Equation 1]}$$

Here, x is low-resolution sensing information as input information, and y may be high-resolution sensing information as output information. In particular, z may be random noise vector information used as input information together with x.

In addition, the model learning device 120 may use a second loss function in the first learning model 610 and the second learning model 620. The second loss function may be a function used in the cGAN model, and may be expressed as in Equation 2.

$$\mathcal{L}_{cGAN}(G,D) = \mathbb{E}_{x,y}[\log D(x,y)] + \mathbb{E}_{x,z}[\log(1 - D(x, G(x,z)))] \qquad \text{[Equation 2]}$$

Here, D(x,y) may be a probability that the second learning model 620 determines the actual sensing information 410 as real, and D(x,G(x,z)) may be a probability that the second learning model 620 determines the virtual information 510 generated from the first learning model 610 as real. In addition, the model learning device 120 may use a final loss function obtained by combining the first loss function and the second loss function. In this case, the learning model may have a Pix2Pix structure. The model learning device 120 may train the first learning model 610 to minimize the final loss function, and may train the second learning model 620 to maximize the final loss function. The final loss function may be expressed as Equation 3.

$$G^* = \arg\min_G \max_D \mathcal{L}_{cGAN}(G,D) + \lambda \mathcal{L}_{L1}(G) \qquad \text{[Equation 3]}$$

Accordingly, the second learning model 620 may be trained to more accurately determine whether the virtual information is real or not, and the first learning model 610 may be trained to generate more realistic virtual information to cheat the second learning model 620.

Referring to FIG. 7, it will be described an example of each structure of the first learning model 610 and the second learning model 620 of the sensing information processing device according to an embodiment of the present disclosure. For example, the first learning model 610 may be a U-Net structure which generates virtual information. For example, the first learning model 610 may be trained or learned using a difference value between actual sensing information and the generated virtual information. Here, the first learning model 610 may be trained or learned by using the determination result of the second learning model 620 for the generated virtual information.

For example, the second learning model 620 may have a neural network structure which receives and determines actual sensing information and virtual information as pairs. For example, the second learning model 620 may be trained or learned with actual sensing information, and then with virtual information generated by the first learning model 610. Here, the second learning model 620 may output 1 if it is determined that the input information is actual sensing information. On the other hand, the second learning model 620 may be learned to output 1 while simultaneously outputting 0 if it is determined that the input information is virtual information.

Accordingly, the first learning model 610 and the second learning model 620 may be trained or learned to improve each other's performance by competitively opposing each other through loss functions which are opposite to each other.

Figure 8:
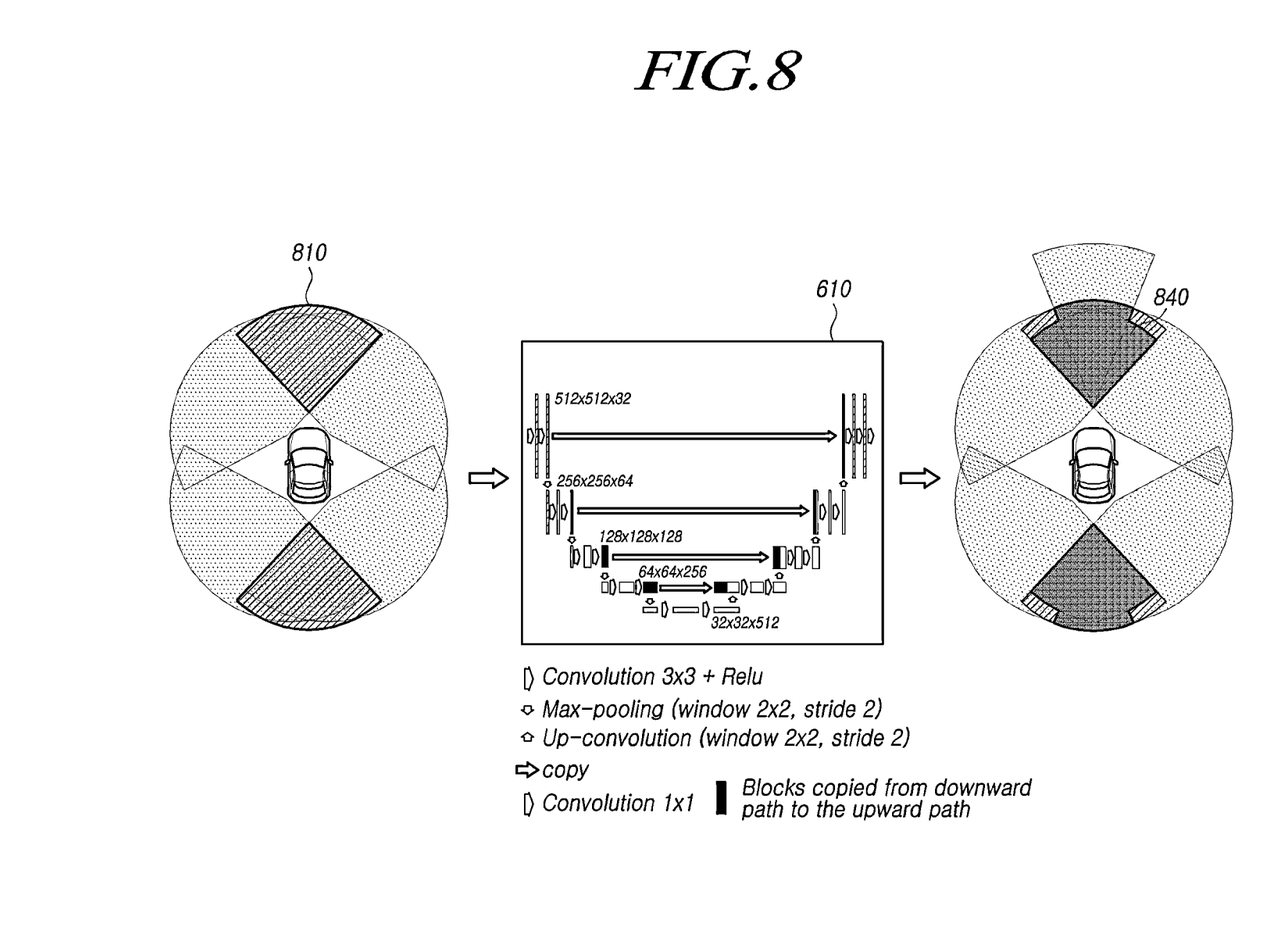
FIG. 8 is a diagram for explaining an information provider of a sensing information processing device according to an embodiment of the present disclosure.

FIG. 8 is a diagram for explaining an information provider of a sensing information processing device according to an embodiment of the present disclosure.

Referring to FIG. 8, it will be described an example in which an information provider of a sensing information processing device according to an embodiment of the present disclosure uses a training-completed learning model. For example, the training-completed learning model may be the first learning model 610. In addition, the first learning model 610 may be implemented with a U-Net as a basic structure. For example, the first learning model 610 may be a model based on a fully convolutional network (FCN) algorithm for image segmentation. Specifically, the first learning model 610 may have a structure in which a first network for acquiring context information of image information and a second network for localization are symmetrical. Here, the first network may be an encoding process with a contracting path. The second network may be a decoding process with an expanding path.

In addition, as an example, the information provider 130 may generate and provide virtual information 840 with improved or increased resolution from sensing information for a specific area based on a training-completed learning model. Here, the sensing information 810 may be information acquired from a sensor supporting low-resolution, and may be a format converted into image information. For example, the information provider 130 may project virtual information 840 generated based on sensing information obtained from a plurality of sensors and simultaneously provide the projected virtual information 840. Alternatively, the information provider 130 may convert the overlap area into the generated virtual information 840 and provide the virtual information.

Hereinafter, it will be described a sensing information processing method performed by the sensing information processing device described with reference to FIGS. 1 to 8.

Figure 9:
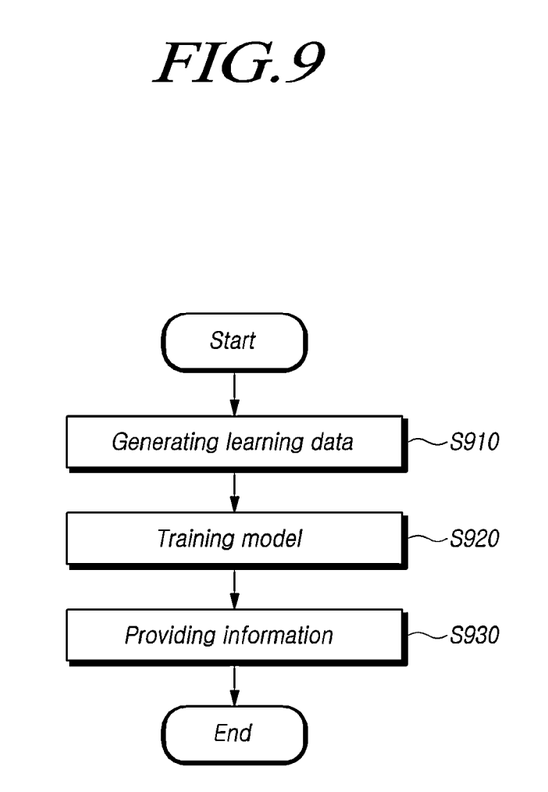
FIG. 9 is a flowchart of a sensing information processing method according to an embodiment of the present disclosure.

FIG. 9 is a flowchart of a sensing information processing method according to an embodiment of the present disclosure.

Referring to FIG. 9, the sensing information processing method according to an embodiment of the present disclosure may include generating learning data (S910). For example, the sensing information processing device may acquire sensing information having different resolutions from a plurality of sensors including a first sensor and a second sensor. In addition, the sensing information processing device may generate learning data by performing preprocessing on the acquired sensing information. For example, the sensing information processing device may acquire first sensing information (e.g. low-resolution sensing information) about, or associated with, a first area detected using a first sensor and second sensing information (e.g. high-resolution sensing information) about, or associated with, a second area detected using a second sensor. For instance, the first sensor may be a corner radar as a low-resolution sensor, which is mounted on the front side or the rear side of the vehicle and has a wide field of view (FOV). The first area may be an overlap area in which angles of view between corner radars on both sides overlap among short-range areas of the front left and right sides or the rear left and right sides detected using corner radars. Meanwhile, the second sensor may be a front or rear radar as a high-resolution sensor which is mounted on the front or rear of the vehicle and has a narrow angle of view. The second area may be a front or rear short-range or long-range area detected using a front radar or a rear radar. However, the corner radar and the front and rear radars are examples of a plurality of sensors, and are not limited thereto. Any combination of one or more sensors with a relatively low resolution and one or more sensors with a relatively high resolution may be used.

For example, the sensing information processing device may generate the learning data using the sensing information about an overlap area in which the first area and the second area partially overlap. That is, the overlap area may be an area in which feature points are detected from both the first sensing information (e.g. low-resolution sensing information) and the second sensing information (e.g. high-resolution sensing information). Specifically, the sensing information processing device may generate the learning data for training or learning the learning model using the first sensing information and the second sensing information for the overlap area. In this case, the second sensing information may be target information for training a learning model with high-resolution sensing information. In addition, the learning data may include virtual information generated by inputting the first sensing information (e.g. low-resolution sensing information) to the learning model.

For example, the sensing information processing device may extract feature information including count information, range rate information, and power information from the sensing information, and convert the extracted feature information into image information. For example, the sensing information processing device may perform pre-processing on point cloud data, which is sensing information acquired from a radar, and convert the sensing information into image information. Specifically, the sensing information processing device may divide each pixel information constituting point cloud data, which is unstructured data, by a preset resolution to determine the presence of one or more objects. Accordingly, if it is determined that one or more objects exist, the sensing information processing device may extract the feature information including the count information about the number of points in the area where the object exists, the range rate information about the relative coordinates between the point and the radar, and power information about the speed and reception strength of the point, and convert the feature information to RGB image information.

The sensing information processing method according to an embodiment may include training a model (S920). For example, the sensing information processing device may train or learn a learning model for generating virtual information about, or associated with, an overlap area based on the learning data. For example, the sensing information processing device may train or learn the learning model by using first and second sensing information about, or associated with, the overlap area and virtual information generated from the learning model as learning data. The learning model may include a first learning model for generating virtual information based on sensing information and a second learning model for determining authenticity of the virtual information. In addition, the learning model may improve the performance of the first learning model and the second learning model by competing with each other. Specifically, the learning model may comprise a generative adversarial network (GAN) model.

For example, the sensing information processing device may train the first learning model to generate virtual information from the first sensing information (e.g. low-resolution sensing information) by using the second sensing information (e.g. high-resolution sensing information) as target information. In addition, the sensing information processing device may train the second learning model to determine authenticity using the sensing information and the virtual information generated from the first learning model. In addition, the sensing information processing device may train the first learning model to decrease the accuracy of the authenticity determination result, and train the second learning model to increase the accuracy of the authenticity determination result based on the authenticity determination result of the sensing information and the virtual information.

The sensing information processing method according to an embodiment may include providing information (S930). For example, the sensing information processing device may generate and provide virtual information with improved or increased resolution from sensing information for a specific area based on a trained learning model. For example, when the training of the learning model is completed, the sensing information processing device may generate virtual information with improved or increased resolution by inputting low-resolution sensing information of a specific area to the learning model. Specifically, when the training of the learning model is completed, the sensing information processing device may generate virtual information with improved or increased resolution by inputting low-resolution sensing information for a specific area to the first learning model for which the training is completed. In addition, the sensing information processing device may additionally generate information for tracking one or more surrounding objects using virtual information generated from sensing information for a specific area.

According to some embodiments of the present disclosure, the learning model may be trained using the sensing information of the corner radar and the sensing information of the front and rear radars, thereby improving the detection performance of the overlap area of the corner radar by using the trained learning model.

Figure 10:
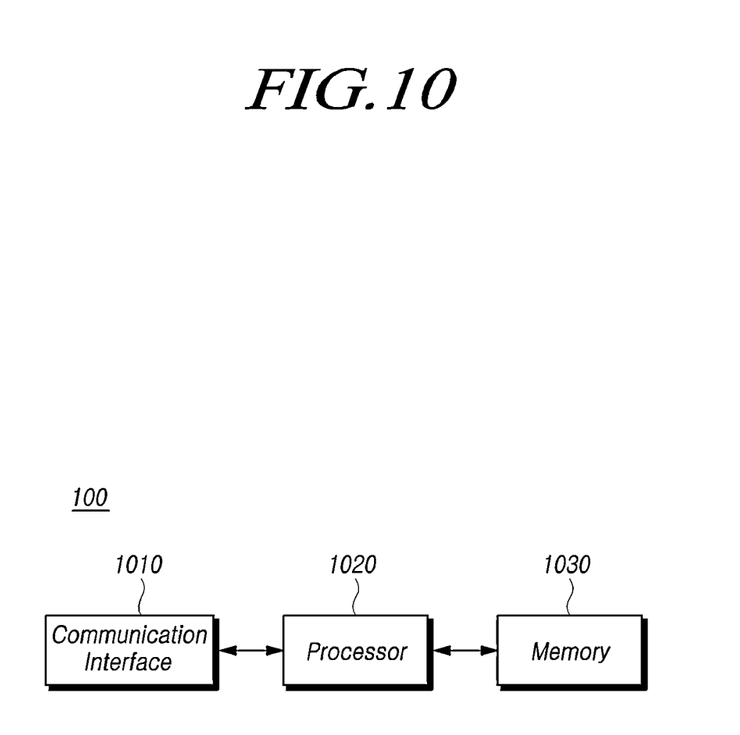
FIG. 10 is a block diagram of a sensing information processing device according to an embodiment of the present disclosure.

FIG. 10 is a block diagram of a sensing information processing device according to an embodiment of the present disclosure.

Referring to FIG. 10, a sensing information processing device 100 according to an embodiment may include a communication interface 1010 and a processor 1020. The sensing information processing device 100 may further include a memory 1030. Each component, communication interface 1010, processor 1020 and memory 1030 may be connected to each other through a communication bus. For example, the communication bus may include circuitry for connecting components together and performing communications (e.g., signals, information, control messages and/or data) between components.

The communication interface 1010 may receive or acquire sensing information having different resolutions detected from a plurality of sensors mounted on or in or associated with a vehicle. In addition, the communication interface 1110 may perform communication with an external device through wireless or wired communication.

The processor 1020 may perform at least one method described above with reference to FIGS. 1 to 9 or an algorithm corresponding to at least one method. The processor 1020 may be a data processing device implemented in hardware having a circuit having a physical structure for executing desired operations. For example, desired operations may include codes or instructions included in a program. For example, a data processor implemented in hardware may include a microprocessor, a central processing unit, a processor core, a multi-core processor, a multi-processor, a neural processing unit (NPU), an application-specific integrated circuit (ASIC), and a field programmable gate array (FPGA).

In addition, the processor 1020 may execute a program and control the sensing information processing device 100. Program codes executed by the processor 1020 may be stored in the memory 1030.

Information on an artificial intelligence-based learning model including a neural network according to an embodiment of the present disclosure may be stored in an internal memory of the processor 1020 or may be stored in an external memory, that is, the memory 1030. For example, the memory 1030 may store sensing information of different resolutions obtained through the communication interface 1010 and detected from a plurality of sensors mounted on or associated with a vehicle. The memory 1030 may store the artificial intelligence-based learning model including a neural network. In addition, the memory 1030 may store various information generated during processing of the processor 1020 and output information extracted by the processor 1020. The output information may be virtual information as an operation result of the learning model or a test result of the learning model. The memory 930 may store learning results of the learning model. The learning result may be obtained from the sensing information processing device 100 or may be obtained from an external device. The learning result may include weight and bias values. In addition, the memory 1030 may store various data and programs. The memory 1030 may include volatile memory or non-volatile memory. The memory 1030 may be provided with a mass storage medium such as a hard disk to store various data.

Even though all the components constituting the embodiments of the present disclosure are described as being combined or operated as one, the present disclosure is not necessarily limited to these embodiments. That is, within the scope of the purpose of the present disclosure, all of the components may be selectively combined with one or more to operate. In addition, although all of the components may be implemented as a single independent piece of hardware, some or all of the components may be selectively combined to perform some or all of the combined functions in one or a plurality of hardware, and may be implemented as a computer program having and recorded on a computer readable medium. The computer readable medium may include program instructions, data files, data structures, etc. alone or in combination. Program commands recorded on the medium may be specially designed and configured for the embodiment or may be known and usable to those skilled in computer software. Examples of computer-readable recording media may include magnetic media such as hard disks, floppy disks and magnetic tapes, optical media such as CD-ROMs and DVDs, magnetic media such as floptical disks, and hardware devices specially configured to store and execute program instructions, such as magneto-optical media, and ROM, RAM, flash memory. Examples of program instructions may include high-level language codes capable of being executed by a computer using an interpreter, as well as machine language codes such as those produced by a compiler. The hardware devices described above may be configured to operate as one or more software modules to perform the operations of the embodiments, and vice versa.

In addition, with respect to the terms such as "include", "comprise" or "have" described above, they mean that the corresponding component can be inherent unless otherwise stated, and thus it should be interpreted as not excluding, but may further including other components. All terms, including technical or scientific terms, have the same meaning as commonly understood by one of ordinary skill in the art related to this disclosure, unless defined otherwise. Commonly used terms, such as terms defined in a dictionary, should be interpreted as consistent with the meaning in the context of the related art, and are not interpreted in an ideal or excessively formal meaning unless explicitly defined in the present disclosure.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A device for processing sensing information, the device comprising:
    a memory; and
    a hardware processor that, when executing computer executable instructions stored in the memory, is configured to:
    receive sensing information of different resolutions from a plurality of sensors including a first sensor and a second sensor, and pre-processing the sensing information to generate learning data;
    train a learning model for generating virtual information associated with an overlap area based on the learning data, wherein the overlap area is an area where areas detected using at least two of the plurality of sensors partially overlap; and
    generate the virtual information with an increased resolution from the sensing information associated with a specific area based on the trained learning model,
    wherein the learning model comprises a first learning model for generating the virtual information based on the sensing information and a second learning model for determining authenticity of the virtual information,
    wherein the hardware processor is configured to train the first learning model to decrease an accuracy of determining the authenticity of the virtual information, and train the second learning model to increase the accuracy of determining the authenticity of the virtual information, based on a determination result of the authenticity of the virtual information and the sensing information,
    wherein the hardware processor is configured to calculate the accuracy of determining the authenticity based on a probability of determining that the sensing information is real and a probability of determining that the virtual information is not real in the second learning model, and train the first learning model to minimize the accuracy of determining the authenticity and train the second learning model to maximize the accuracy of determining the authenticity.

2. The device of claim 1, wherein the hardware processor is configured to receive low-resolution sensing information associated with a first area detected using the first sensor and high-resolution sensing information associated with a second area detected using the second sensor.

3. The device of claim 1, wherein the hardware processor is configured to generate the learning data by extracting feature information from the overlap area, and converting the extracted feature information of the overlap area into image information.

4. The device of claim 1, wherein the hardware processor is configured to extract feature information including count information, range rate information, and power information from the sensing information and convert the feature information into image information.

5. The device of claim 1, wherein the hardware processor is configured to train the first learning model to generate the virtual information from first sensing information using second sensing information as target information.

6. The device of claim 1, wherein the hardware processor is configured to train the second learning model to determine the authenticity of the virtual information using the sensing information and the virtual information generated from the first learning model.

7. The device of claim 1, wherein the learning model comprises a generative adversarial network (GAN) model.

8. The device of claim 1, wherein the hardware processor is configured to generate information for tracking one or more surrounding objects using virtual information generated from the sensing information associated with the specific area.

9. A method for processing sensing information, the method comprising:
receiving sensing information of different resolutions from a plurality of sensors including a first sensor and a second sensor, and generating learning data by pre-processing the sensing information;
training a learning model for generating virtual information associated with an overlap area based on the learning data, wherein the overlap area is an area where areas detected using at least two of the plurality of sensors partially overlap; and
generating the virtual information with an increased resolution from the sensing information associated with a specific area based on the trained learning model,
wherein the learning model comprises a first learning model for generating the virtual information based on the sensing information and a second learning model for determining authenticity of the virtual information,
wherein the training of the learning model for generating the virtual information comprises training the first learning model to decrease an accuracy of determining the authenticity of the virtual information, and training the second learning model to increase the accuracy of determining the authenticity of the virtual information, based on a determination result of the authenticity of the virtual information and the sensing information,
wherein the training of the learning model for generating the virtual information comprises calculating the accuracy of determining the authenticity based on a probability of determining that the sensing information is real and a probability of determining that the virtual information is not real in the second learning model, and training the first learning model to minimize the accuracy of determining the authenticity and training the second learning model to maximize the accuracy of determining the authenticity.

10. The method of claim 9, wherein the receiving of the sensing information of the different resolutions comprises receiving low-resolution sensing information associated with a first area detected using the first sensor and high-resolution sensing information associated with a second area detected using the second sensor.

11. The method of claim 9, wherein the generating of the virtual information comprises generating the learning data by extracting feature information from the overlap area, and converting the extracted feature information of the overlap area into image information.

12. The method of claim 9, wherein the generating of the virtual information with the increased resolution comprises extracting feature information including count information, range rate information, and power information from the sensing information and converting the feature information into image information.

13. The method of claim 9, wherein the training of the learning model for generating the virtual information comprises training the first learning model to generate the virtual information from first sensing information using second sensing information as target information.

14. The method of claim 9, wherein the training of the learning model for generating the virtual information comprises training the second learning model to determine authenticity of the virtual information using the sensing information and the virtual information generated from the first learning model.

15. The method of claim 9, wherein the learning model comprises a generative adversarial network (GAN) model.

16. The method of claim 9, wherein the generating of the virtual information with the increased resolution comprises generating information for tracking one or more surrounding objects using virtual information generated from the sensing information associated with the specific area.

* * * * *